United States Patent [19]
Ribbens et al.

[11] Patent Number: 5,495,415
[45] Date of Patent: *Feb. 27, 1996

[54] METHOD AND SYSTEM FOR DETECTING A MISFIRE OF A RECIPROCATING INTERNAL COMBUSTION ENGINE

[75] Inventors: William B. Ribbens; Jaehong Park, both of Ann Arbor, Mich.; Giorgio Rizzoni, Worthington, Ohio

[73] Assignee: Regents of the University of Michigan, Ann Arbor, Mich.

[ * ] Notice: The term of this patent shall not extend beyond the expiration date of Pat. No. 5,239,473.

[21] Appl. No.: 154,271

[22] Filed: Nov. 18, 1993

[51] Int. Cl.$^6$ .............................. G06F 19/00; F02P 5/14; G01L 3/26
[52] U.S. Cl. .............. 364/431.08; 364/431.07; 364/431.03; 364/431.04; 73/116; 73/117.2; 73/117.3; 73/119 A; 123/425; 123/436; 123/419; 123/478; 395/911; 395/913; 395/924; 395/22
[58] Field of Search .................... 364/431.01–431.12, 364/424.1, 550, 551.01, 5; 123/425, 436, 478, 419, 625, 637; 395/911, 913, 22, 924, 2, 21; 73/116, 117.3, 117.2, 119 A, 35; 324/379; 60/277

[56] References Cited

U.S. PATENT DOCUMENTS

| | | | |
|---|---|---|---|
| 4,783,998 | 11/1988 | Sander | 364/508 |
| 5,041,976 | 8/1991 | Marko et al. | 364/431.04 |
| 5,041,979 | 8/1991 | Hirka et al. | 364/431.04 |
| 5,093,792 | 3/1992 | Taki et al. | 364/431.01 |
| 5,200,898 | 4/1993 | Yuhara et al. | 364/431.05 |
| 5,200,899 | 4/1993 | Ribbens et al. | 364/431.08 |
| 5,239,473 | 8/1993 | Ribbens et al. | 364/431.01 |
| 5,241,480 | 8/1993 | Takaku et al. | 364/431.08 |
| 5,278,760 | 1/1994 | Ribbens et al. | 364/431.01 |
| 5,353,634 | 10/1994 | Baba et al. | 364/431.07 |

Primary Examiner—Kevin J. Teska
Assistant Examiner—Jacques H. Louis-Jacques
Attorney, Agent, or Firm—Brooks & Kushman

[57] ABSTRACT

A trainable, pattern recognition-based method and system for detecting misfire in a reciprocating internal combustion engine having an engine cycle frequency in the frequency domain from crankshaft angular velocity. Preferably, a pattern recognition system including a neural network is utilized. Crankshaft angular position is sensed to develop an electrical signal which is a function of the crankshaft angular velocity. The electrical signal contains data which is sampled. The sampled data is transformed to an equivalent frequency domain spectrum including frequency components of the engine cycle frequency and harmonics thereof. A load signal such as mass airflow and an RPM signal are generated. The magnitudes and phases of the frequency components and the load and RPM signals are supplied to the neural network to distinguish between a true misfire and normal cyclic variability which characterizes the combustion process.

16 Claims, 2 Drawing Sheets

METHOD AND SYSTEM FOR DETECTING A MISFIRE OF A RECIPROCATING INTERNAL COMBUSTION ENGINE

CROSS-REFERENCE TO RELATED PATENTS AND APPLICATIONS

This application is related to the following issued patents: (1) "Method And System For Detecting The Misfire Of An Internal Combustion Engine Utilizing Angular Velocity Fluctuations", U.S. Pat. No. 5,200,899; and (2) "Method And System For Detecting The Misfire Of An Internal Combustion Engine Utilizing Angular Velocity Fluctuations", U.S. Pat. No. 5,239,473, both of which are hereby expressly incorporated by reference in their entirety. This application is also a continuation-in-process application of a co-pending patent applications entitled: (1) "Method And System For Detecting The Misfire Of An Internal Combustion Engine Utilizing Engine Torque Non-uniformity", Ser. No. 759,397, filed Sep. 13, 1991; and (2) "Method And System For Detecting The Misfire Of A Reciprocating Internal Combustion Engine In The Frequency Domain", Ser. No. 023,342, filed Feb. 26, 1993 which, in turn, is a continuation-in-process application of U.S. Ser. No. 741,338 filed Aug. 21, 1991, now U.S. Pat. No. 5,239,473.

1. Technical Field

This invention relates to methods and systems for misfire detection in a reciprocating internal combustion engine of an automobile and, in particular, to pattern recognition-based methods and systems for detecting such misfires.

2. Background Art

There are a number of requirements for on-board diagnostics II (OBDII) of the California Air Resources Board (CARB). Once such requirement is the ability to detect misfires in the engine in order to identify a malfunction.

U.S. Pat. No. 5,200,899 noted above discloses instrumentation and computational procedures for detecting misfires in automotive engines such as is required by California Air Resources on-board diagnostic-II regulations.

Whereas normal engine combustion involves a certain level of torque nonuniformity, misfire significantly increases the nonuniformity. This nonuniformity can be readily observed in the frequency domain. Furthermore, the torque nonuniformity results in a nonuniformity in crankshaft angular speed.

The above noted application having Ser. No. 08/023,342 discloses computational methods in which samples of crankshaft angular speed are obtained. Selected components for each complete engine cycle (i.e., crankshaft revolutions) of the spectrum are obtained using a suitable method (e.g. Fast Fourier Transform (FFT)).

Normally, the Fourier component at engine cycle frequency is sufficient to detect misfires although other components can be useful for certain powertrain configurations (e.g., the component at cylinder firing frequency). For this spectrum computation, the input sequence $\{w_k\}$ is obtained by sampling crankshaft angular speed w at uniformly spaced intervals of crankshaft angular position $\theta$:

$$w_k = w(\theta_k) \qquad k = 1, 2, \ldots, K$$

$$\theta_k = \frac{4\pi k}{K}.$$

Various methods are available for noncontacting measurement of $w_k$ (as disclosed in U.S. Pat. No. 5,200,899).

Then, the pth Fourier complex amplitude $A_p$ is computed using a suitable algorithm. For example (although it is not computationally efficient), there is the well known discrete Fourier transform (DFT):

$$A_p = \sum_{k=1}^{K} w_k W_K^{pk} \qquad p = 1, 2, \ldots, K.$$

where $$W_K = e^{j\frac{2\pi}{K}}.$$

The complex amplitude at engine cycle frequency is $A_1$.

$$A_1 = M_1 e^{j\phi_1}$$

where $M_1$ is the amplitude and $\phi_1$ is the phase.

According to U.S. Pat. No. 5,200,899, misfire can be detected by applying a decision algorithm to this (these) component(s). For example, one such criterion is a simple threshold comparison of the amplitude of the engine cycle frequency ($M_1$).

$$M_1 < M_T \rightarrow \text{no misfire}$$

$$M_1 > M_T \rightarrow \text{misfire}$$

where $M_T$ is the threshold value. Alternatively, a decision algorithm in the $M_1$, $\phi_1$ plane can be used as disclosed in the above application having Ser. No. 08/023,342.

The U.S. patent to Taki et al, U.S. Pat No. 5,093,792, discloses an apparatus for predicting and discriminating whether or not misfire will occur from the cylinder pressure before the occurrence of the misfire, by the use of a three layered neural network. The cylinder pressure signal detected by a cylinder pressure sensor is sampled and input to each of the elements of the input layer. The signal then is modulated corresponding to the strength (weight) of the connection between each of the elements, and transmitted to the hidden and output layers. The magnitude of signal from the elements of the output layer represents prediction and discrimination results. The weight is learned and determined by a back propagation method.

The U.S. patent to Marko et al, U.S. Pat. No. 5,041,976, discloses a diagnostic system which uses pattern recognition, such as a neural network, for electronic automotive control systems.

The U.S. patent to Yuhara et al, U.S. Pat. No. 5,022,898, discloses a method of controlling a motor vehicle having an engine, with a neural network which has a learning capability. An operating condition of the motor vehicle is controlled based on a predicted value of a throttle valve opening, which is represented by a periodically produced output signal from the neural network.

SUMMARY OF THE INVENTION

An object of the present invention is to provide an adaptive method and system for misfire detection from crankshaft angular velocity in the frequency domain wherein errors in detecting misfires are reduced to basically zero for input operation over a full range of powertrain operating conditions.

Another object of the present invention is to provide a method and system for misfire detection from crankshaft angular velocity in the frequency domain wherein optimal system performance (i.e., minimum errors) is provided by utilizing a decision algorithm which has a threshold which is adaptive with engine operating conditions. Typically, the threshold conditions on the Fourier component(s) used in the decision algorithm vary with RPM and load on the engine. The latter can be represented by a suitable measurement for the particular vehicle (e.g., mass airflow, manifold pressure, throttle position). Such measurements are routinely made for engine control purposes in modern automotive engines.

Still another object of the present invention is to provide a method and system for misfire detection which complies with OBDII of the CARB.

In carrying out the above objects and other objects of the present invention, a method is provided for detecting the misfire of a reciprocating internal combustion engine with a trainable pattern recognition system. The engine includes a plurality of reciprocating components having an engine cycle frequency, at least one cylinder and a crankshaft. The method includes the step of generating an electrical signal as a function of crankshaft angular velocity. The electrical signal contains data. The method also includes the steps of sampling the data synchronously with crankshaft angular position at a sampling rate to obtain sampled data and transforming the sampled data to an equivalent frequency domain spectrum, including frequency components having complex amplitudes at the engine cycle frequency and harmonics thereof. Finally, the method includes the step of applying an algorithm to the magnitudes of the frequency components. The algorithm distinguishes between a true misfire and normal cyclic variability which characterizes the combustion process in each cylinder of the engine to thereby obtain a misfire signal. The step of applying includes the step of inputting the magnitudes of the frequency components to the pattern recognition system to identify the misfire.

Preferably, the pattern recognition system is trainable and includes a neural network.

Further in carrying out the above objects and other objects, a system is provided for carrying out the above method steps.

The above objects and other objects, features, and advantages of the present invention are readily apparent from the following detailed description of the best mode for carrying out the invention when taken in connection with the accompanying drawings.

BRIEF DESCRIPTION OF THE BEST MODE

Figure 1:
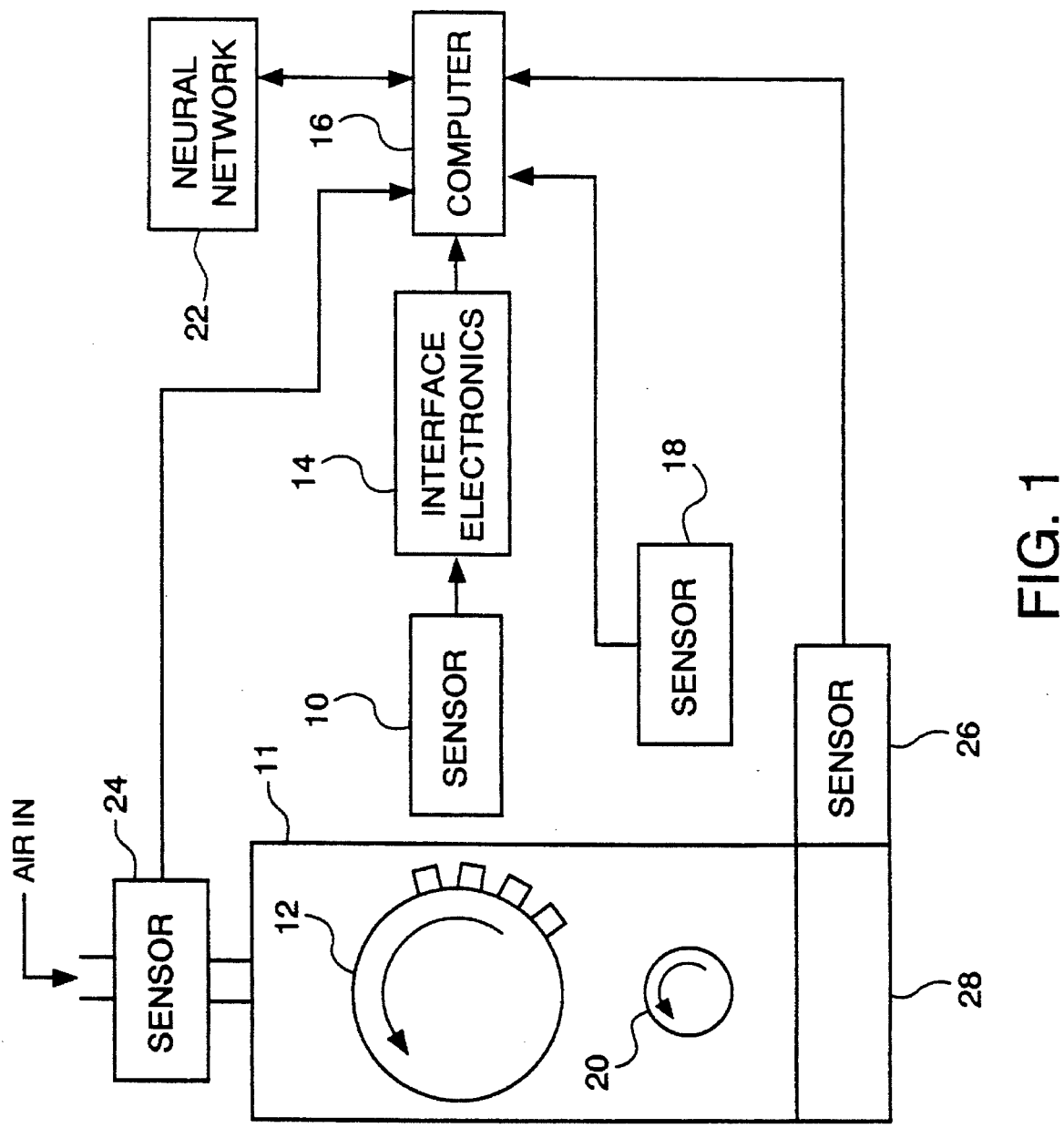
FIG. 1 is a schematic block diagram illustrating a system constructed in accordance with the present invention.

Referring now to the drawing figures, there is illustrated in FIG. 1 the components of a misfire detection system constructed in accordance with the present invention. In particular, a sensor 10 is positioned such that it responds to the angular position or angular speed of a crankshaft 12 of a reciprocating internal combustion engine 11. Electronic circuitry in the form of interface electronics 14 permit data samples to be read by the computer 16. For example, a continuous time analog of angular speed can be generated in which:

$$v = k\omega_e$$

where $\omega_e$ is instantaneous crankshaft angular speed, v is the output voltage and k is a constant. A discrete time sampled version of this signal may alternatively be obtained, and is the preferred method.

A computer 16 makes computations necessary to detect misfire. These computations are explained below and include the capability of computing the spectrum of the crankshaft angular speed. The computer may employ, for example, a microprocessor configured to perform computations under program control. The program can, for example, conveniently be stored in a ROM memory chip.

The present method utilizes samples of crankshaft angular speed as will presently be shown. These samples are sufficiently accurate for the procedures explained below with a relatively low number of samples per engine revolution. Such samples (denoted $\hat{\omega}_k$)

for the kth sample are obtained using a multi-toothed structure connected to the crankshaft 12 and the noncontacting sensor. Letting $M_T$ be the number of teeth, then:

$$\hat{\omega}_k = \frac{2\pi}{M_T(t_k - t_{k-1})}$$

where $t_k$=time the kth tooth passes the sensor. In this expression, the angular interval is the angle between a successive pair of teeth, i.e., $$\frac{2\pi}{M_T}.$$

Such samples are obtained in discrete time by measuring the time for the passage of an interval of crankshaft rotation.

In the present method and system, misfire is detected by examining the spectrum of the crankshaft angular speed signal. This signal may be obtained by any of the instrumentation methods outlined in the above-noted related patents and applications or by any applicable discrete time estimation method.

The spectrum of the angular speed signal may be computed using any one of a variety of commonly known techniques (e.g., discrete Fourier transform DFT or fast Fourier transform (FFT)). In this procedure, a sample of the crankshaft angular speed signal is obtained. The duration of this sample can be chosen to be a multiple of crankshaft revolutions.

By way of illustration, it is convenient to consider the spectrum as obtained by the discrete Fourier transform (DFT). For this purpose, the crankshaft angular speed is sampled at discrete instants of time or at discrete crankshaft angles for any given engine cycle or integer multiple of an engine cycle:

$$\omega_n = \omega(t_k) \qquad k = 0, 1, 2 \ldots K$$

or $$\omega_n = \omega(\theta_k) \qquad k = 0, 1, 2 \ldots K$$

where K is the number of samples in the observation period (e.g. one complete engine cycle). These samples are obtained for a time interval T or a crankshaft angle θ. The spectrum for this set of samples is represented by the complex number $A_p$:

$$A_p = \sum_{k=0}^{K} \omega_k (W_K)^{pk} \qquad p = 0, 1, \ldots K.$$

where $$W_K = \exp\left[j\left(\frac{2\pi}{K}\right)\right]$$

The complex values of $A_p$ represents the magnitude and phase of the Fourier component of frequency $f_p$:

$$f_p = \frac{p}{T}.$$

For example, p=1 corresponds to the fundamental frequency for the time interval [0,T] or the crankshaft angular interval [0,4π].

Obviously, this algorithm is only exemplary. Other candidates include FFT which is faster and is applicable if K is a power of 2 (for example, K=$2^6$).

For certain applications, a time interval (or crankshaft interval) of two complete crankshaft revolutions corresponding to the one complete engine cycle for a 4 stroke/cycle reciprocating internal combustion engine is used. Other choices for this sample will also suffice such as four complete revolutions corresponding to two engine cycles. Such choice is beneficial for detecting isolated single misfire events, for example.

In this method, the complete spectrum need not be computed. Rather, only a few Fourier components are needed. One convenient choice is to compute the fundamental Fourier component at frequency $f_1$ for a complete engine cycle, i.e., T is the period for two complete crankshaft revolutions. In this case, $f_1$ is the fundamental frequency of a Fourier analysis of angular speed for a duration of one complete engine cycle and can conveniently be called engine cycle frequency. Also of interest is the component at N times this frequency ($f_c$) where N=number of cylinders ($f_c$=N$f_1$). The Fourier amplitude at engine cycle frequency $f_1$ is $M_1$ and at cylinder firing frequency (i.e., $f_n$) is $M_N$ for a N cylinder engine and for a period T corresponding to one engine cycle (two crankshaft revolutions).

In one embodiment, it is possible to identify individual misfiring cylinder(s) by means of an engine cycle signal generated by a sensor 18 which is activated by a specific point on the engine camshaft 20, as illustrated in FIG. 1. For example, a magnetic sensor can be positioned close to a lug on the camshaft 20. A voltage pulse is then generated each time this lug rotated past the sensor axis. This algorithm is discussed in greater detail hereinbelow.

Additionally, the spectrum can be computed for a sample of duration for two complete engine cycles. In this case, a convenient choice for misfire detection is the fundamental frequency $f_1$, the second harmonic $f_2$=2$f_1$ and the harmonic at cylinder firing frequency $f_c$=2Nf.

Misfire can also be detected from the Fourier components via electronic circuitry. For example, one embodiment of the present invention incorporates a computer which performs calculations to obtain the Fourier components of crankshaft angular speed. This computer can detect misfire via one of many algorithms.

Figure 2:
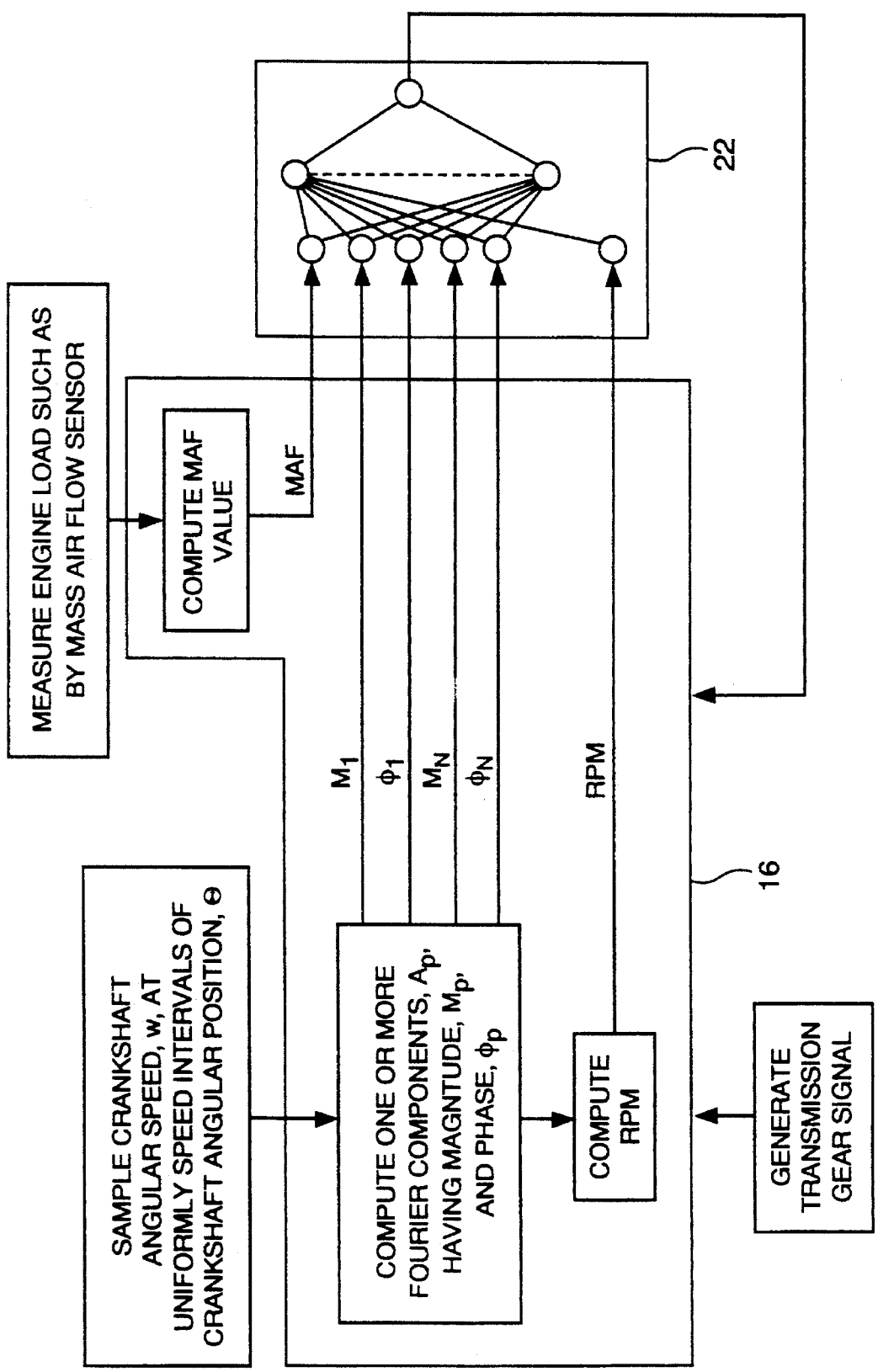
FIG. 2 is a block diagram partially in flow chart form illustrating the method and system of the present invention.

Referring now to FIG. 2, the standard structure for a neural network (NN) is illustrated as having an input layer consisting of one or more nodes, one or more hidden layers and an output layer. For the purposes of misfire detection in automotive engines, computational efficiency must be high to minimize the burden on the on-board computational capabilities (e.g., in engine control system). Consequently, a preferred embodiment of the present invention includes a neural network 22 having a single hidden layer. The input layer has nodes for the magnitude $M_p$, and phase $\theta_p$ of one or more Fourier components $A_p$ as explained above. In addition, an input to the NN 22 has a measurement of RPM (suitably averaged for the particular powertrain configuration).

Referring to FIGS. 1 and 2, in addition, an averaged measure of engine load such as mass airflow (MAF) or manifold pressure depending upon the engine control configuration for the specific vehicle application is provided by a sensor 24. Also, a sensor 26 is coupled to a transmission 28 of the engine 11 to provide a signal indicating the transmission gear. For example, a preferred embodiment incorporates $M_1$, $\phi_1$, $M_N$, $\phi_N$, RPM and MAF (where N=# of cylinders). It should be noted that other Fourier components may prove useful as inputs to the NN for certain engine/drivetrain configurations. This embodiment has a single hidden layer of 20 nodes and a single node output layer, although other NN configurations are also applicable to certain configurations.

The NN 22 is trained in the standard way any NN is trained by providing the input data for a relatively large number of engine cycles, over a range of operating conditions spanning the entire operating envelope for the particular powertrain involved in the tests. The NN 22 converged to a "trained" NN after about 30,000 engine cycles.

In testing the NN 22, a total error rate of about 0.02% was obtained for input operation over the full range of powertrain operating conditions.

The performance of a misfire detection system having a statistical decision mechanism such as explained here, has two error sources: (1) missed detection in which a misfire occurs that is not detected, and (2) a false alarm in which normal combustion occurs but a misfire is declared by the system.

One of the relative advantages of the NN 22 in the misfire detection method is its facility for rapid transient operation. A conventional detection algorithm for detection uses threshold values which can be adapted to varying operating conditions (e.g., via lookup tables indexed by load and RPM). On the other hand, the NN 22 requires no parameter changes as the engine operating condition changes. Even rapid transient operating condition changes will be accommodated automatically in the NN detection method.

It will be recognized that a misfire detection system, such as explained above, will be unique for any given vehicle model configuration. However, a separate set of parameters will be required for a different model. Yet, once the system architecture and parameters including those values for the NN 22 have been established, this system will function with all vehicles of that particular model which are produced. Thus, the system disclosed herein requires no special parameter adjustment for any given production run of a given model configuration.

A misfire detection algorithm can be based upon the Fourier amplitude at engine cycle frequency $f_1$ (i.e. $M_1$).

The misfire algorithm for this example is:

$M_1$>threshold ⇒ misfire $M_1$<threshold ⇒ normal combustion.

While the best mode for carrying out the invention has been described in detail, those familiar with the art to which this invention relates will recognize various alternative designs and embodiments for practicing the invention as defined by the following claims.

What is claimed is:

1. A method for detecting a misfire of a reciprocating internal combustion engine with a trainable pattern recognition system, the engine including a plurality of reciprocating components having an engine cycle frequency, at least one cylinder and a crankshaft, the method comprising the steps of:

generating an electrical signal as a function of crankshaft angular velocity, the electrical signal containing data;

sampling the data synchronously with crankshaft angular position at a sampling rate to obtain sampled data;

transforming the sampled data to an equivalent frequency domain spectrum, including frequency components having complex amplitudes at the engine cycle frequency and harmonics thereof; and applying an algorithm to the frequency components, which algorithm distinguishes between a true misfire and normal cyclic variability which characterizes the combustion process in each cylinder of the engine to thereby obtain a misfire signal, the step of applying the algorithm including the step of inputting the frequency components as input vectors to the pattern recognition system to identify the misfire.

2. The method of claim 1 wherein the frequency components have phases and wherein the magnitudes and phases of the frequency components are input to the pattern recognition system as input vectors to identify the misfire.

3. The method of claim 2 wherein the pattern recognition system includes a neural network having an input layer, at least one hidden layer, and an output layer.

4. The method of claim 2 further comprising the step of generating a load signal based on engine load, wherein the load signal and the magnitudes and phases of the frequency components are input to the pattern recognition system as input vectors to identify the misfire.

5. The method of claim 4 wherein the load signal is based on mass airflow to the engine.

6. The method of claim 4 wherein the engine has a manifold and wherein the load signal is based on manifold pressure.

7. The method of claim 4 further comprising the step of generating an RPM signal based on the speed of the engine wherein the RPM signal, the load signal and the magnitudes and phases of the frequency components are input to the pattern recognition system as input vectors to identify the misfire.

8. The method of claim 7 wherein the engine has a transmission attached thereto and wherein the method further comprises the step of providing a gear signal indicating a gear of the transmission wherein the algorithm utilizes the gear signal.

9. A system for detecting a misfire of a reciprocating internal combustion engine including a plurality of reciprocating components having an engine cycle frequency, at least one cylinder and a crankshaft, the system comprising:

means for generating an electrical signal as a function of crankshaft angular velocity, the electrical signal containing data;

means for sampling the data synchronously with crankshaft angular position at a sampling rate to obtain sampled data;

means for transforming the sampled data to an equivalent frequency domain spectrum, including frequency components having complex amplitudes at the engine cycle frequency; and means for applying an algorithm to the frequency components, which algorithm distinguishes between a true misfire and normal cyclic variability which characterizes the combustion process in each cylinder of the engine to thereby obtain a misfire signal, the means for applying the algorithm including a pattern recognition system for receiving the frequency components as input vectors and generating an output signal to identify the misfire.

10. The system of claim 9 wherein the frequency components have phases and wherein the magnitudes and phases of the frequency components are input to the pattern recognition system as input vectors to identify the misfire.

11. The system of claim 10 wherein the pattern recognition system includes a neural network having an input layer, at least one hidden layer, and an output layer.

12. The system of claim 10 further comprising means for generating a load signal based on engine load, wherein the load signal and the magnitudes and phases of the frequency components are input to the pattern recognition system as input vectors to identify the misfire.

13. The system of claim 12 wherein the load signal is based on mass airflow to the engine.

14. The system of claim 12 wherein the engine has a manifold and wherein the load signal is based on manifold pressure.

15. The system of claim 12 further comprising means for generating an RPM signal based on the speed of the engine wherein the RPM signal, the load signal and the magnitudes and phases of the frequency components are input to the pattern recognition system as input vectors to identify the misfire.

16. The system of claim 15 wherein the engine has a transmission attached thereto and wherein the system further comprises means for providing a gear signal indicating a gear of the transmission wherein the algorithm utilizes the gear signal.

* * * * *